No. 101,824.  
PATENTED APR. 12, 1870.

M. W. CLARK.  
COMBINED PULLEY AND CLAMP.

Witnesses  
Thos. H. Dodge  
Geo. H. Miller

Inventor  
Milton W. Clark

United States Patent Office.

MILTON W. CLARK, OF WORCESTER, MASSACHUSETTS, ASSIGNOR TO R BALL & CO., OF SAME PLACE.

Letters Patent No. 101,824, dated April 12, 1870.

IMPROVEMENT IN COMBINED PULLEY AND CLAMP.

The Schedule referred to in these Letters Patent and making part of the same.

*To all whom it may concern:*

Be it known that I, MILTON W. CLARK, of the city and county of Worcester and Commonwealth of Massachusetts, have invented certain new and useful Improvements in Combined Pulley and Clamp; and I do hereby declare that the following is a full, clear, and exact description of the same, reference being had to the accompanying drawings forming a part of this specification, in which—

Figure 1:
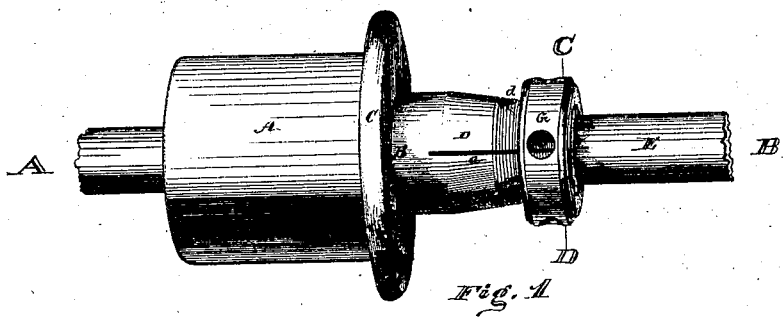
Figure 1 represents a perspective view of my combined pulley and clamp.
Figure 2:
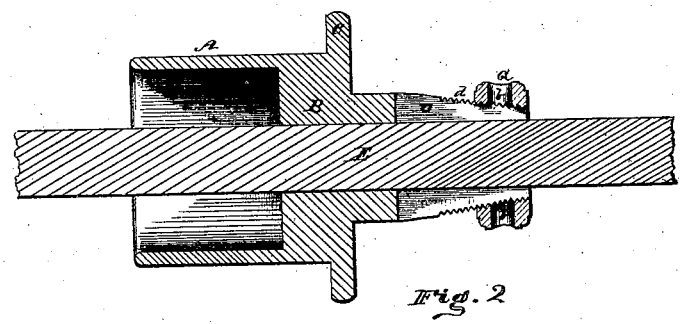
Figure 2 represents a longitudinal central section on line A B, fig. 1.
Figure 3:
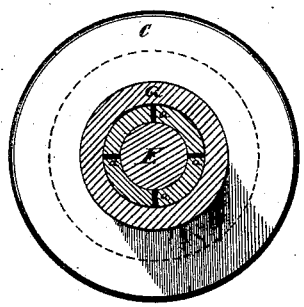
Figure 3 represents a transverse section on line C D, fig. 1.

To enable those skilled in the art to which my invention belongs to make and use the same, I will proceed to describe it more in detail.

The nature of my invention consists in a combined pulley and clamp, substantially as hereafter described.

In the drawings, the part marked A is the rim of the pulley, which is formed on the hub B, and provided with a guard-flange C, for supporting the belt when the pulley is used on an upright shaft, for which purpose it is particularly adapted.

The hub B is prolonged beyond the end of the pulley to form the clamp-sleeve D, which latter is made tapering toward its outer end, and is provided with a screw-thread $d$, upon which is screwed the clamping-ring G.

Longitudinal slots $a$ are formed in the sleeve D, cutting its outer end into flexible sections, so that, when the clamping-ring G is screwed on, the sections of the sleeve D will be pressed firmly against the shaft E, thereby retaining the pulley securely in position on said shaft.

Holes $b$ are formed in the clamp-ring G, in which to insert the spanner or bar by which the ring is turned.

It will be observed that the pulley can be readily secured in any position along the shaft, or even with the rim A projecting beyond its end, and also that the axis of the pulley and the axis of the shaft are always the same, since the clamp embraces the shaft equally on all sides, thereby retaining the shaft and pulley in their proper relative positions, which is not always the case when the pulley is secured by means of a spline, or set-screw, the tendency of which is to throw the pulley out of line with the axis of the shaft.

Another advantage is, that the shaft does not require to be cut away, as is the case when a spline is used for securing the pulley. Neither is the surface of the shaft roughened by use, as is the case when set-screws are employed for the same purpose.

If preferred, the pulley may be made with a sleeve D, and clamping-ring G at each end, and also with a flange C at each end.

Having described my improved combined pulley and clamp,

What I claim as new and of my invention, and desire to secure by Letters Patent, is—

As a new article of manufacture, a pulley provided with a projecting hub, formed so as to constitute a tapering and split clamp-sleeve upon which is screwed the clamping-ring or nut, so as to clamp the pulley in any desired position upon the shaft, substantially as shown and set forth.

MILTON W. CLARK.

Witnesses:
THOS. H. DODGE,
GEO. H. MILLER.